United States Patent
Watabe et al.

(10) Patent No.: US 6,950,462 B2
(45) Date of Patent: Sep. 27, 2005

(54) VIDEO ENCODING APPARATUS, VIDEO ENCODING METHOD, AND FRAME RATE CONVERSION APPARATUS

(75) Inventors: Akihiro Watabe, Kashiba (JP); Akihiro Otani, Mino (JP); Masaki Toyokura, Itami (JP)

(73) Assignee: Matsushita Electric Industrial Co., Ltd. (JP)

( * ) Notice: Subject to any disclaimer, the term of this patent is extended or adjusted under 35 U.S.C. 154(b) by 503 days.

(21) Appl. No.: 10/092,725

(22) Filed: Mar. 8, 2002

(65) Prior Publication Data

US 2002/0126756 A1 Sep. 12, 2002

(30) Foreign Application Priority Data

Mar. 8, 2001 (JP) ........................................ 2001-064368

(51) Int. Cl.⁷ ................................................. H04B 1/66
(52) U.S. Cl. ................................................. 375/240.02
(58) Field of Search ....................... 375/240.01–240.29; 348/157; 345/573; H04B 1/66

(56) References Cited

U.S. PATENT DOCUMENTS

| 5,552,824 A | * | 9/1996 | DeAngelis et al. | ......... 348/157 |
| 5,717,441 A | * | 2/1998 | Serizawa et al. | ........... 345/573 |
| 6,104,864 A | | 8/2000 | Kondo et al. | ............... 386/117 |
| 6,542,183 B1 | * | 4/2003 | DeAngelis et al. | ......... 348/157 |

* cited by examiner

*Primary Examiner*—Tung Vo
(74) *Attorney, Agent, or Firm*—Steptoe & Johnson LLP

(57) ABSTRACT

When an input picture is inputted to a video interface and stored in a reordering memory, the input time is recorded utilizing a reference time generator and a frame sync signal, and a frame memory to be encoded by an encoding unit is designated using the time information. Therefore, an encoder, which can perform stable encoding even when intervals of vertical sync signals are varied, is realized.

5 Claims, 11 Drawing Sheets

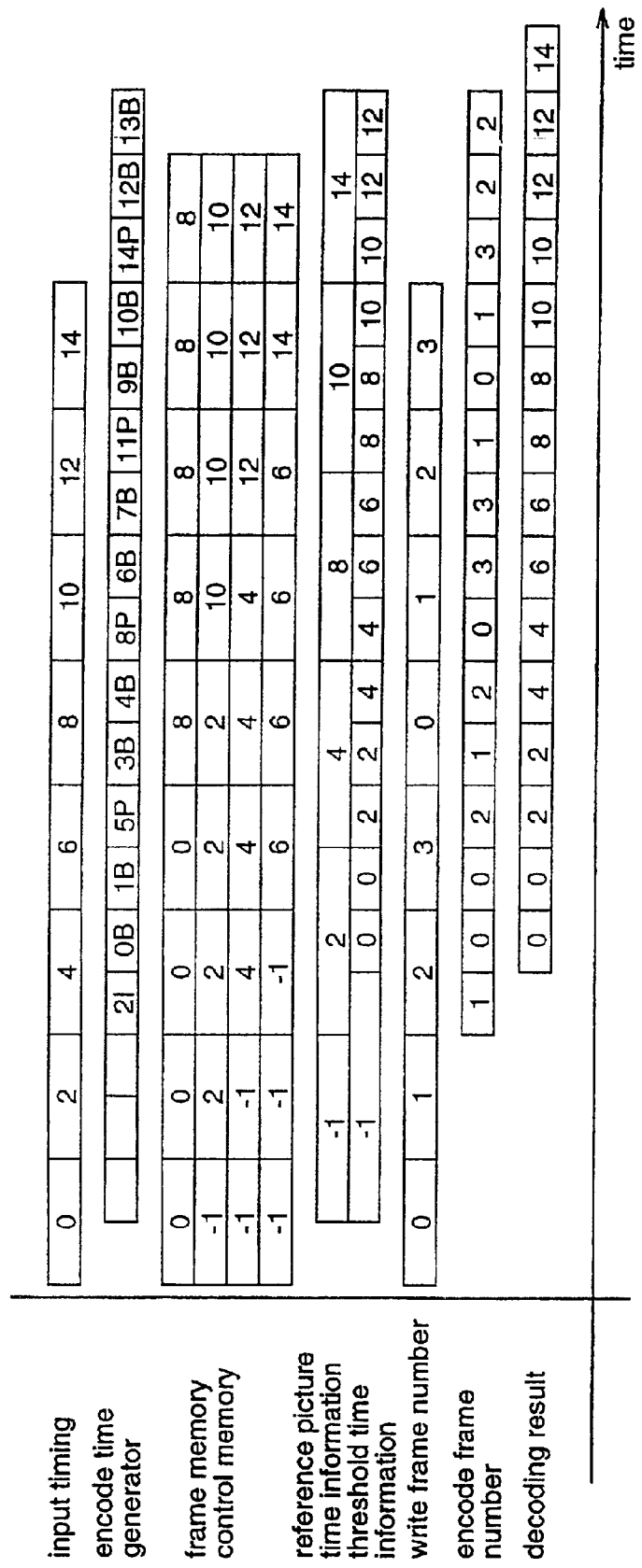

VIDEO ENCODING APPARATUS, VIDEO ENCODING METHOD, AND FRAME RATE CONVERSION APPARATUS

FIELD OF THE INVENTION

The present invention relates to a video encoding apparatus and a video encoding method and, more particularly, to those for correcting a deviation of a vertical sync signal, when data supplied from the outside are compressed and recorded within a limited period of time.

BACKGROUND OF THE INVENTION

MPEG2 (ISO/IEC 13818-2) is known as an international standard of video compression. In video compression methods such as MPEG2, in order to increase the compression efficiency by bidirectional prediction, the order of input pictures should be changed (reordering) when encoding the pictures.

When an input NTSC signal is MPEG-encoded in real time, the NTSC signal is initially converted into a digital signal, e.g., a D1 format which is a video component of a non-compressed and CCIR-601 convertible digital format, and the digital signal is encoded. At this time, the signal may fluctuate or the temporal input may deviate when using an asynchronous clock, resulting in a phenomenon in which decoded pictures are disordered.

In order to solve this problem, a process of correcting a deviation of a sync signal when inputting an analog signal, which process is generally called "time base correct (TBC)", is required in the stage prior to an encoder.

However, as digital processing has become widespread, it is more important to suppress a deviation of a frame cycle due to asynchronicity of a clock than to suppress a signal fluctuation.

As a technique for correcting a deviation of a vertical sync signal, for example, Japanese Published Patent Application No. Hei.11-261968 discloses a video compression recording apparatus with an external input function, which is provided with a means for judging a vertical sync interval of an external input signal. In this apparatus, when the external input signal is changed by a switcher or the like and it is judged that the vertical sync interval of the external input signal is shorter than a normal vertical sync interval, a process of thinning the short-interval vertical sync signal is carried out. On the other hand, when it is judged that the vertical sync interval of the external input signal is longer than the normal vertical sync interval, capture of the external input signal is stopped for a period of time that is equivalent to the increase in the vertical sync interval. Thereby, occurrence of an incorrect stream is prevented.

Although the conventional video encoding apparatus is constructed as described above to prevent occurrence of an incorrect stream, since capture of the external signal is stopped when the vertical sync interval becomes longer than the normal interval, data are not supplied to the encoder during this period of time.

Furthermore, a buffer memory for temporarily holding data to be inputted to the encoder, having a capacity equivalent to one frame, is usually provided in the stage prior to the encoder. However, when a process of correcting a deviation of a frame cycle is to be carried out in the stage prior to the encoder, an additional memory for this process is required, which leads to an increase in device size, or another circuit should be added, resulting in an increase in costs.

SUMMARY OF THE INVENTION

The present invention is made to solve the above-described problems and has for its object to provide a video encoding apparatus (MPEG encoder) which can correct a deviation of a vertical sync signal, without adding an extra memory, with suppressing an increase in circuit scale, by giving an attention to a memory for picture reordering, which is possessed by an encoder such as an MPEG encoder, and successfully utilizing the reordering function of the memory.

It is another object of the present invention to provide a frame rate conversion apparatus which performs encoding at an arbitrary frame rate, on the basis of an externally inputted signal.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a video encoding apparatus comprises: a picture memory for holding inputted pictures; a reference time generation means for generating time information to be a reference; a picture input means for writing an inputted picture into a designated position in the picture memory; an input time recording means for recording a time that is outputted from the reference time generation means when a picture is inputted to the picture input means, and a position in the picture memory where the inputted picture is written, such that the time is associated with the position; an encoding means for encoding data in a designated position in the picture memory; and a picture memory designation means for designating positions in the picture memory which are targeted for processing, and indicating the positions to the picture input means and the encoding means, respectively, on the basis of the information recorded by the input time recording means. In this video encoding apparatus, when an input picture is written in the picture memory, a reference time and a position in the picture memory where the input picture is written are stored in association with each other, and pictures are written in an available area in the picture memory. Therefore, occurrence of an incorrect stream can be easily prevented by performing encoding on the basis of the time information. Further, since picture data can be stored in a picture memory for reordering which has conventionally been employed, the device size is not increased, and there is no necessity of adding another circuit, resulting in no increase in costs.

According to a second aspect of the present invention, in the video encoding apparatus according to the first aspect, when the picture memory designation means designates a position in the picture memory for the encoding means, the picture memory designation means designates a position corresponding to a time which is closest to an ideal input time of data to be encoded.

According to a third aspect of the present invention, in the video encoding apparatus according to the first aspect, when the picture memory designation means designates a position in the picture memory for the picture input means, if data in the picture memory has not yet been encoded, the picture memory designation means stops data input until a writable memory area is secured.

According to a fourth aspect of the present invention, in the video encoding apparatus according to the first aspect, when the picture memory designation means designates a position in the picture memory for the picture input means, if data in the picture memory has not yet been encoded, the picture memory designation means designates a position corresponding to the latest time.

According to a fifth aspect of the present invention, a video encoding method employing a picture memory for performing reordering of pictures for predictive coding, comprises the steps of: a picture inputting step of writing an inputted picture into a designated position in the picture memory; an input time recording step of recording a time at which the picture is inputted, and the position in the picture memory where the inputted picture is written, such that the time is associated with the position; a picture memory designation step of designating positions in the picture memory which are targeted for processing in the picture inputting step and an encoding step, respectively, on the basis of the information recorded in the input time recording step; and an encoding step of encoding data in a designated address in the picture memory. In this video encoding method, when an input picture is written in the picture memory, a reference time and a position in the picture memory where the input picture is written are stored in association with each other, and pictures are written in an available area in the picture memory. Therefore, occurrence of an incorrect stream can be easily prevented by performing encoding on the basis of the time information. Further, since picture data can be stored in a picture memory for reordering which has conventionally been employed, the device size is not increased, and there is no necessity of adding another circuit, resulting in no increase in costs.

According to a sixth aspect of the present invention, in the video encoding method according to the fifth aspect, the picture memory designation step includes a step of designating a position in the picture memory, which position is closest to an ideal input time of data to be encoded, when designating a position in the picture memory in the encoding step.

According to a seventh aspect of the present invention, in the video encoding method according to the fifth aspect, the picture memory designation step includes a step of stopping data input until a writable memory area is secured, if data in the picture memory has not yet been encoded when designating a position in the picture memory in the picture inputting step.

According to an eighth aspect of the present invention, in the video encoding method according to the fifth aspect, the picture memory designation step includes a step of designating a position in the picture memory, which position corresponds to the latest time, if data in the picture memory has not yet been encoded when designating a position in the picture memory in the picture inputting step.

According to a ninth aspect of the present invention, a frame rate conversion apparatus comprises: plural frame memories for holding inputted pictures; a reference time generation means for generating time information to be a reference; a picture input means for writing an inputted picture into a designated address in a frame memory; an input time recording means for recording a time which is outputted from the reference time generation means when a picture is inputted to the picture input means, and an address in the frame memory where the inputted picture is written; an encoding cycle setting means for outputting an encoding cycle setting signal which designates an encoding cycle; an encoding means for encoding data in a designated address in the frame memory; and a picture memory designation means for designating addresses in the frame memory which are targeted for processing, for the picture input means and the encoding means, respectively, on the basis of the information recorded by the input time recording means, and the encoding cycle setting signal outputted from the encoding cycle setting means. In this apparatus, picture data before being encoded and input time information thereof are temporarily stored in a frame memory for reordering, and the picture data stored in the frame memory is successively encoded according to an encode cycle setting signal that is supplied from the outside. Therefore, it is possible to encode a bit stream of a frame cycle that is completely different from an input frame cycle.

BRIEF DESCRIPTION OF THE DRAWINGS

FIG. 11 is a timing chart when encoding is carried out with half the cycle of an input frame, in the frame rate conversion apparatus.

DETAILED DESCRIPTION OF THE PREFERRED EMBODIMENTS

Hereinafter, preferred embodiments of the present invention will be described with reference to the drawings.
[Embodiment 1]

Figure 1:
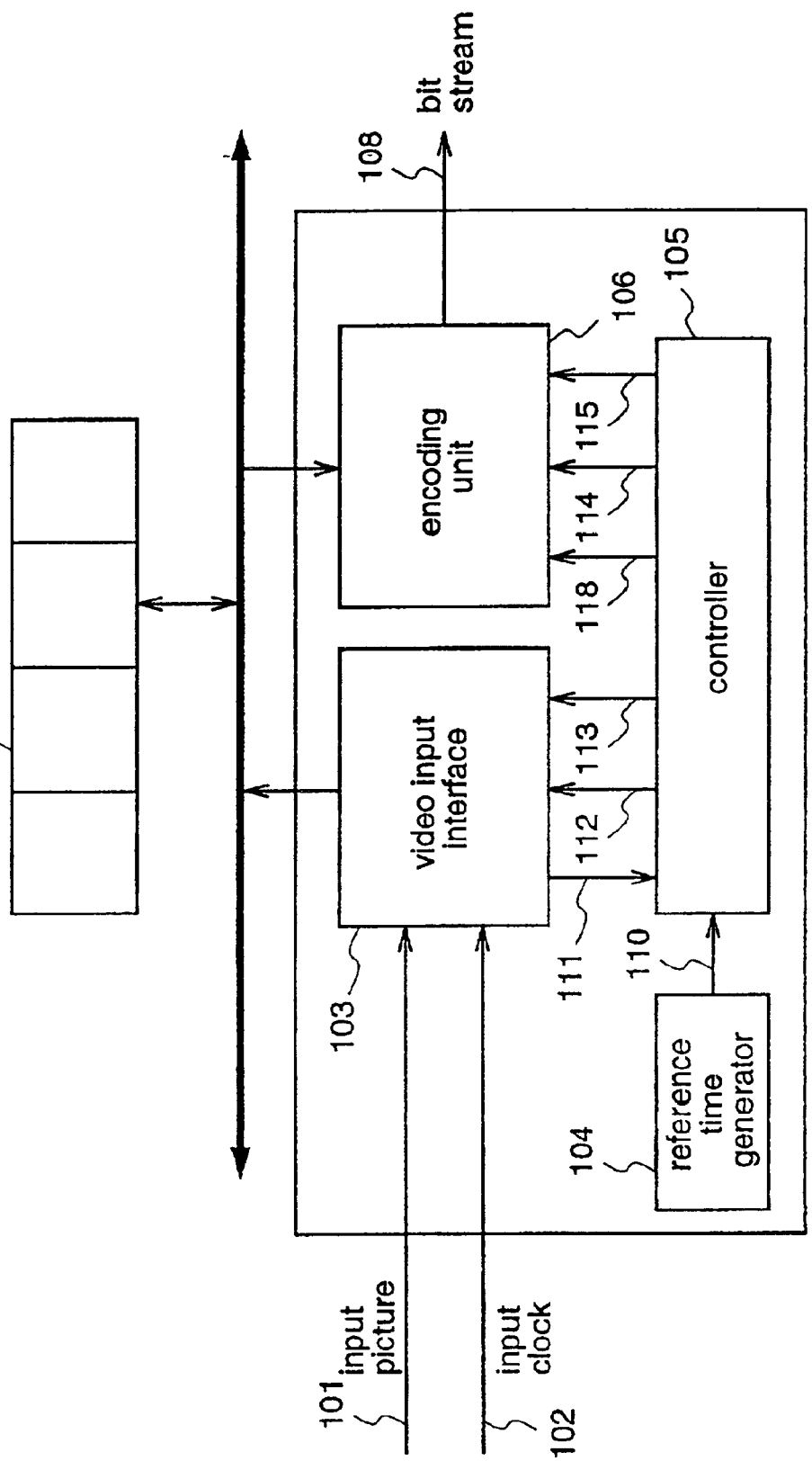
FIG. 1 is a block diagram illustrating the construction of an MPEG encoder which is a video encoding apparatus according to a first embodiment of the present invention.

FIG. 1 is a block diagram illustrating the construction of a video encoding apparatus according to a first embodiment of the invention, which is adapted to an MPEG encoder.

With reference to FIG. 1, an MPEG encoder according to the first embodiment comprises a video input interface 103 to which an input picture 101 and an input clock 102 are supplied; a reference time generator 104 for generating a reference time; an encoding unit 106 for encoding the input picture and outputting a bit stream 108; a controller 105 for controlling the operations of the video input interface 103 and the encoding unit 106, on receipt of the reference time and a frame sync signal 111; and a memory 107 for reordering (hereinafter referred to as a reordering memory).

To be specific, the reordering memory 107 is a memory for picture reordering, which is adapted to bidirectional prediction specific to MPEG. The reordering memory 107 is composed of plural frame memories, and each frame memory is designated by a frame memory number. In MPEG encoding, pictures are classified into three types: I pictures, P pictures, and B pictures. Especially, a B picture is formed by bidirectional prediction from a previous reference picture (a picture in the past) and a subsequent reference picture (a picture in the future), and therefore, a picture that is subsequent to the B picture (a picture in the future) must be encoded before the B picture. This processing is called "reordering".

The minimum capacity of the reordering memory required for encoding is usually decided depending on a frame interval between reference frames. Usually, this frame interval is referred to as "M". It is premised that four frames are used in this first embodiment.

The video input interface 103 (video input means) writes the input picture 101 into a frame memory (107) which is designated by a write frame number 112, when a video input enable signal 113 from the controller 105 is "1". Further, the video input interface 103 generates a frame sync signal 111 on the basis of the input picture 101. On the other hand, when the video input enable signal is "0", no data is written in the frame memory. However, a frame sync signal 111 is generated even in this case.

The reference time generator 104 generates a time to be a reference time, and time information 110 generated by the reference time generator 104 is transmitted to the controller 105 (frame memory designation means). The reference time generator 104 is not required to be synchronized with the input clock 102.

The encoding unit 106 (encoding means) encodes picture data designated by an encode frame number in the reordering memory 107, and outputs it as a bit stream 108. Of course, this encoding is carried out in encoding order, and the encoding order will be later described in more detail.

The MPEG encoder shown in FIG. 1 is similar to the conventional MPEG encoder except that the reference time generator 104 is newly provided, and its circuit scale is almost equal to that of the conventional one.

Hereinafter, a description will be given of a general data flow of the MPEG encoder.

The input picture 101 synchronized with the input clock 102 is inputted to the video input interface 103. This video input interface 103 stores the input picture in a designated frame in the reordering memory 107, according to an instruction of the controller 105.

The stored input pictures are encoded by the encoding unit 106 according to the encoding order, and outputted as a bit stream 108.

The controller 105 reads the time information 110 when the frame sync signal 111 is generated, and records it. The controller 105 controls the video input interface 103 and the encoding unit 106 according to the time information 110. A specific control method will be described later.

Figure 2:
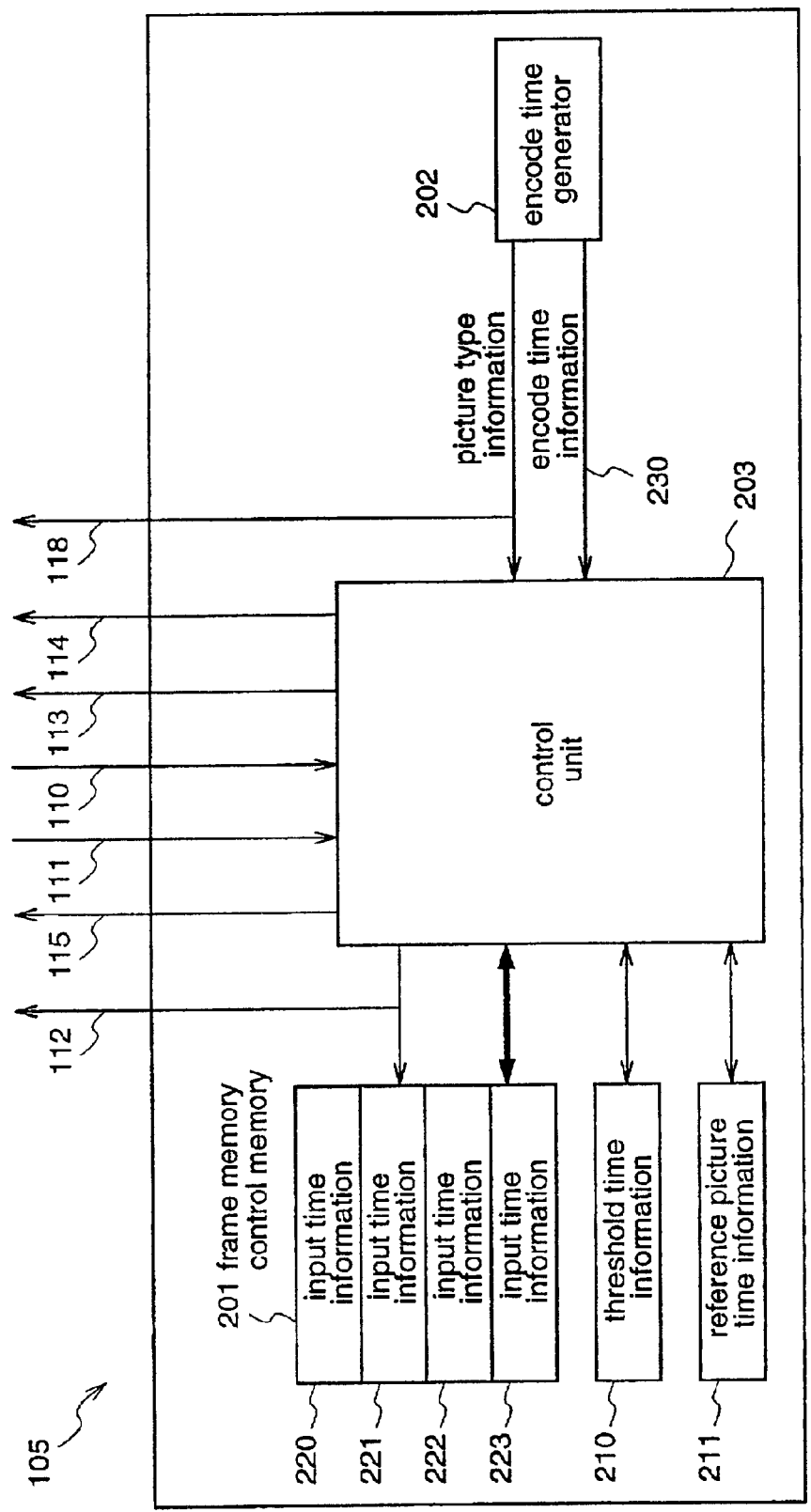
FIG. 2 is a block diagram illustrating the construction of a controller which is a component of the MPEG encoder.

FIG. 2 shows the construction of the controller 105 in detail. The controller 105 includes frame memory control memories as many as the frame memories. Since four frame memories are employed in this first embodiment, four memory areas are prepared. The respective areas can hold input time information 220~223, respectively. Further, the controller 105 holds reference picture time information 211 indicating an input time of I or P picture which have just previously encoded, and threshold time information 210 indicating a time at which data in an already-encoded frame memory was encoded. As described above, since the process of reordering is carried out in MPEG encoding, even when a picture has been encoded, a picture at a time previous to this encoded picture is not always unnecessary. Further, since the purpose is frame synchronization, there is a possibility that a picture which has already been encoded might be subjected to encoding and, therefore, already encoded data is not always unnecessary.

So, after a B picture has been encoded, all of data to be encoded thereafter have times after the time of the B picture. After an I or P picture has been encoded, data to be encoded before the I or P picture has a time after a time of an I or P picture which has previously been encoded. The reason is as follows. Even if a B picture is encoded thereafter, forward reference time information of the B picture matches the encode time of the I or P picture which has previously encoded. Accordingly, the controller 105 holds the two kinds of time information, i.e., the threshold time information and the reference picture time information, to find erasable candidates from the frame memories. Therefore, in order to find erasable candidates from the frame memories, pictures in the past with respect to the threshold time information are regarded as erasable data, and the reference picture time information indicates a time of an I or P picture which has been encoded most recently or which will be encoded just now, and this time is used for calculating the threshold time information. The initial values of the reference picture time information 210 and the threshold time information 211 take negative times.

An encode time generator 202 generates an ideal input time of a frame to be encoded. The operation of the encode time generator 202 will be described later.

A control unit 203 receives the frame sync signal 111 and a signal from the encode time generator 202, and generates various kinds of control signals. The operation flow of the control unit 203 is shown in FIGS. 3 and 4.

Figure 3:
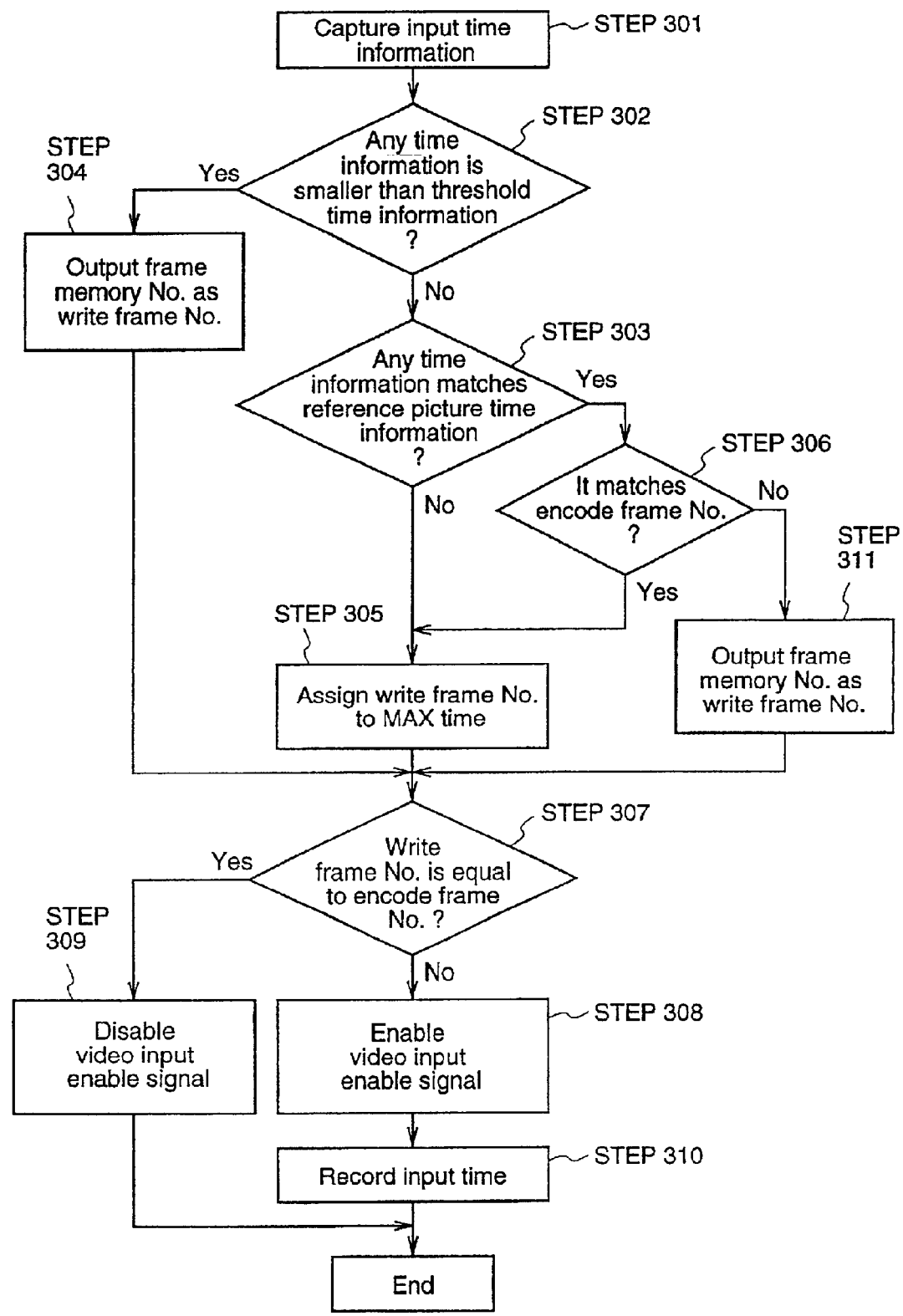
FIG. 3 is a flowchart illustrating the operation of the controller when a frame sync signal is inputted to the controller.
Figure 4:
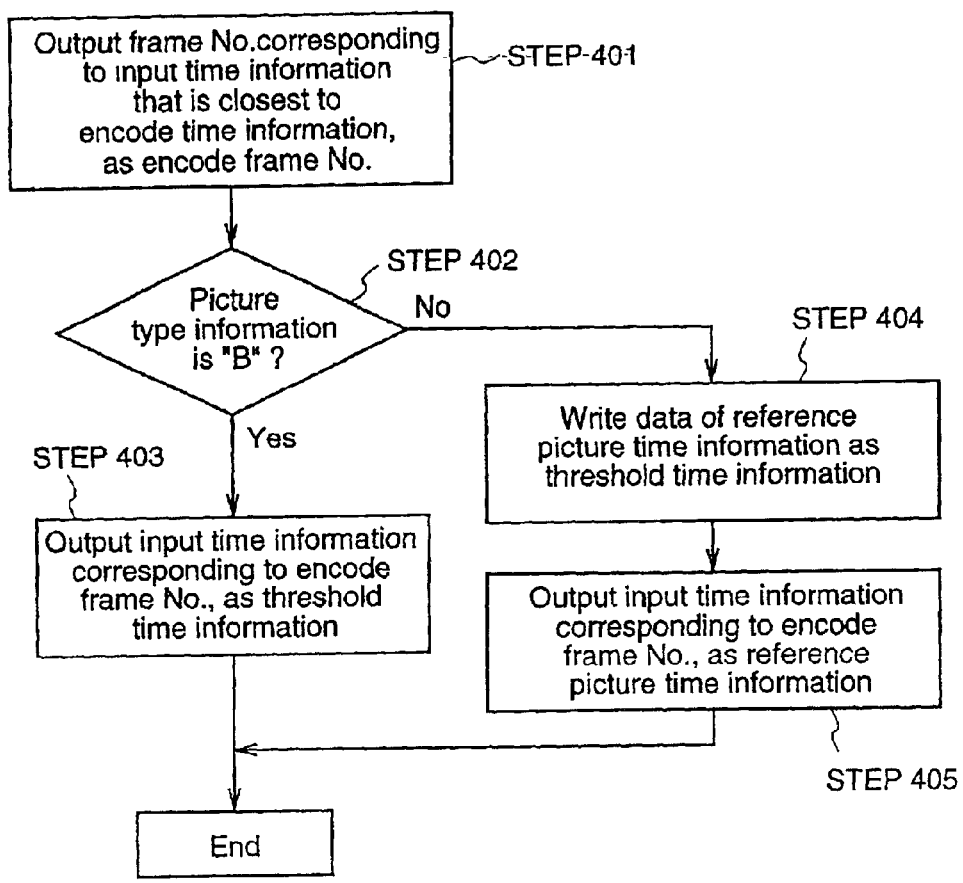
FIG. 4 is a flowchart illustrating the operation of the controller which specifies an encode frame number, according to the first embodiment.

FIG. 3 is a flowchart illustrating the operation of the control unit 203 when the frame sync signal is generated.

The control unit 203 captures the time information 110 in STEP 301, and proceeds to STEP 302.

In STEP 302, it is judged whether any of the input time information 220~223 is smaller than the threshold time information 210 or not. When none of the input time information 220~223 is smaller than the threshold time information 210, the control unit 203 goes to STEP 303. Otherwise, it goes to STEP 304. In this judgement process, it is found whether there is any I, P, or B picture which has already been encoded and will not be used any more, among the data stored in the reordering memory 107 comprising the frame memories.

When any of the input time information 220~223 is smaller than the threshold time information 210, the control unit 203 goes to STEP 304, and outputs a frame memory number corresponding to the input time information smaller than the threshold time information 210 as a write frame number 112, and then goes to STEP 307 which will be described later.

On the other hand, when it is judged in STEP 302 that none of the input time information 220~223 is smaller than the threshold time information 210, the control unit 203 goes to STEP 303, and judges whether any of the input time information 220~223 matches the reference picture time information 211 or not. When none of the input time information 220~223 matches the reference picture time information 211, it means that no empty frame memory exists. Then, the control unit 203 goes to STEP 305, and searches for data having the latest time. On the other hand, when it is judged in STEP 303 that any of the input time information 220~223 matches the reference picture time information 211, the control unit 203 goes to STEP 306, and judges whether the frame corresponding to the input time information matches the encode frame or not. When the frame matches the encode frame, this frame cannot be used because it is being encoded. So, the control unit 203 returns to STEP 305, and searches for data having the latest time.

On the other hand, when it is judged in STEP 306 that the frame does not match the encode frame, it means that a writable frame memory exists. So, the control unit 203 outputs the frame memory number corresponding to the input time information (any of the input time information 220~223) that matches the reference picture time information 211, as a write frame number 112.

In STEP 305, as no writable empty frame exists, the control unit 203 searches the frame memories for data having the latest time, and designates the frame number of this data as a writable frame number. This data reordering process enables data at a time when the input timing returns to its normal state to be decoded without being skipped.

STEP 307 to STEP 310 are process steps for checking as to whether data can certainly be written in the outputted write frame number, i.e., the frame number into which the data will be written.

More specifically, in STEP 307, it is judged whether the write frame number 112 which is outputted in STEP 304, 305, or 311 matches the encode frame number 114 or not. When the write frame number 112 does not match the encode frame number 114, it means that data can be written in this frame number. So, the control unit 203 goes to STEP 308, and sets the video input enable signal 113 in its enable state, whereby writing of data into the memory 107 is enabled actually. In STEP 310, the time information captured in STEP 301 is written in the area (any of the input time information 220~223) corresponding to the write frame number 206, thereby completing the processing.

On the other hand, when it is judged in STEP 307 that the write frame number 112 matches the encode frame number 114, writing of data into this frame might cause destruction of data being encoded, the control unit 203 proceeds to STEP 309, and sets the video input enable signal 113 in its disable state to complete the processing. Although it is rare in usual processing that the result of judgement in STEP 307 is absence of writable area, such situation might occur when the encode time becomes longer than necessary for any reason.

FIG. 4 shows a process flow of the control unit 203 on the basis of the information generated by the encode time generator 202.

In STEP 401, the control unit 203 selects input time information closest to the encode time information 230 from among the input time information 220~223 except for one corresponding to the write frame number 206, and outputs the frame number corresponding to the selected time information as an encode frame number 114, and then goes to STEP 402.

In STEP 402, it is judged whether picture type information is "B" or not. When it is "B", the control unit 203 goes to STEP 403. Otherwise, the control unit 203 goes to STEP 404.

In STEP 403, any of the input time information 220~223 which corresponds to the encode frame number 114 is written as the threshold time information 210, thereby completing the processing.

In STEP 404, the data of the reference picture time information 211 is written as the threshold time information 210. Then, in STEP 405, any of the input time information 220~223 which corresponds to the encode frame number 114 is written as the reference picture time information 211, thereby completing the processing.

As described above, in order to find an empty frame memory, data of a time earlier than the threshold time information (refer to STEP 302) is searched for, and when the corresponding data exists, this data can be erased (overwritten). When there is no data earlier than the threshold time information, a frame memory having the same information as the reference picture time information is searched for (refer to STEP 303), and it is checked whether the frame memory is currently being encoded (STEP 306). When the frame memory is not being encoded, the frame memory is treated as an erasable (over-writable) frame memory, whereby the process of correcting a frame cycle deviation can be carried out using the reordering memory 107 without adversely affecting the encoding process.

Figure 5:
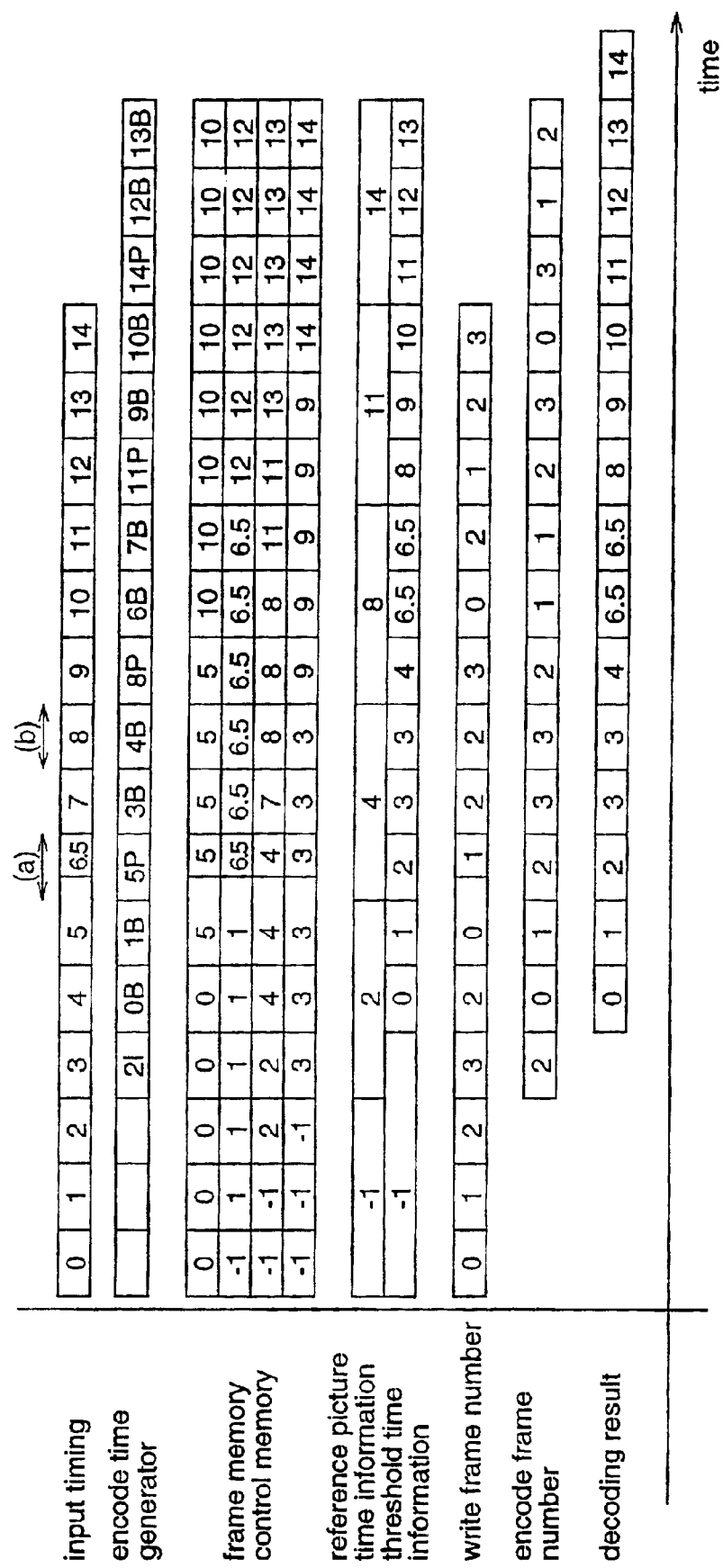
FIG. 5 is a timing chart illustrating the condition of use of a frame memory for input frames, in the MPEG encoder according to the first embodiment.

FIG. 5 is a timing chart illustrating the use condition of the frame memory corresponding to the input frame according to the above-mentioned control.

The first stage in FIG. 5 shows the picture input timing. To simplify the description, a period for vertical synchronization or the like is not particularly shown. Further, an input period of normal one frame is "1".

With reference to FIG. 5, the input time of frame "5" is delayed to be 1.5 frame, and the following frame "6" is started not from its original time "6" but from time "6.5", and the frame input returns to the normal state at time "7".

The second stage in FIG. 5 shows the encode time information 230 (the order along which pictures are encoded) and the picture type information 231 (I, P, B) which are generated by the encode time generator 202.

The decoding result 505 at the lowermost stage in FIG. 5 shows data to be outputted as the result of decoding the generated codes.

As shown in FIG. 5, as encoding is carried out according to the flow of the controller 105, when section (a) is normal, the frame inputted at time "5" should be encoded. However, since the input has not yet ended at time "5", the picture which has been inputted at time "4" is being encoded.

Further, at section (b), the input at time "8" is written over the picture of time "7" which has not yet been encoded. Accordingly, the picture of time "7" is consequently skipped without being encoded.

As can be seen from FIG. 5, in the decoding result, the picture of time "3" freezes and the pictures of times "5" and "7" are skipped. As a whole, however, input pictures are satisfactorily decoded without a failure in decoding.

As described above, according to the first embodiment of the invention, the video encoding apparatus is provided with the reference time generator 104 for generating a reference time, and the input picture data before being encoded and the time information generated by the reference time generator 104 are temporarily stored in the frame memories 107 for reordering, and the picture data stored in each frame memory is encoded according to the time information which is recorded simultaneously with the picture data. Therefore, even when vertical synchronization deviates, the picture data can be successively encoded according to the time information, whereby the disordered input pictures can be encoded with less sense of abnormality.

Further, since the video encoding apparatus performs the processing using the frame memories 107 for reordering which are originally installed in the apparatus, there is no increase in memories, and the control can be performed relatively easily. Further, since the video encoding apparatus of this first embodiment can be implemented by almost the same construction as the conventional encoder, sharing of circuits is realized, whereby an increase in costs is suppressed.

While in this first embodiment four frames are employed, similar video encoding apparatus can be implemented even when the number of frames is further increased. Further, similar control may be carried out not in frame units but in field units.

Moreover, the encode parameters to be used when encoding is performed may be varied utilizing the time information. For example, when a difference from an ideal playback time is considerably large, it may be judged as a scene change, and the encoding order may be altered.

[Embodiment 2]

Figure 6:
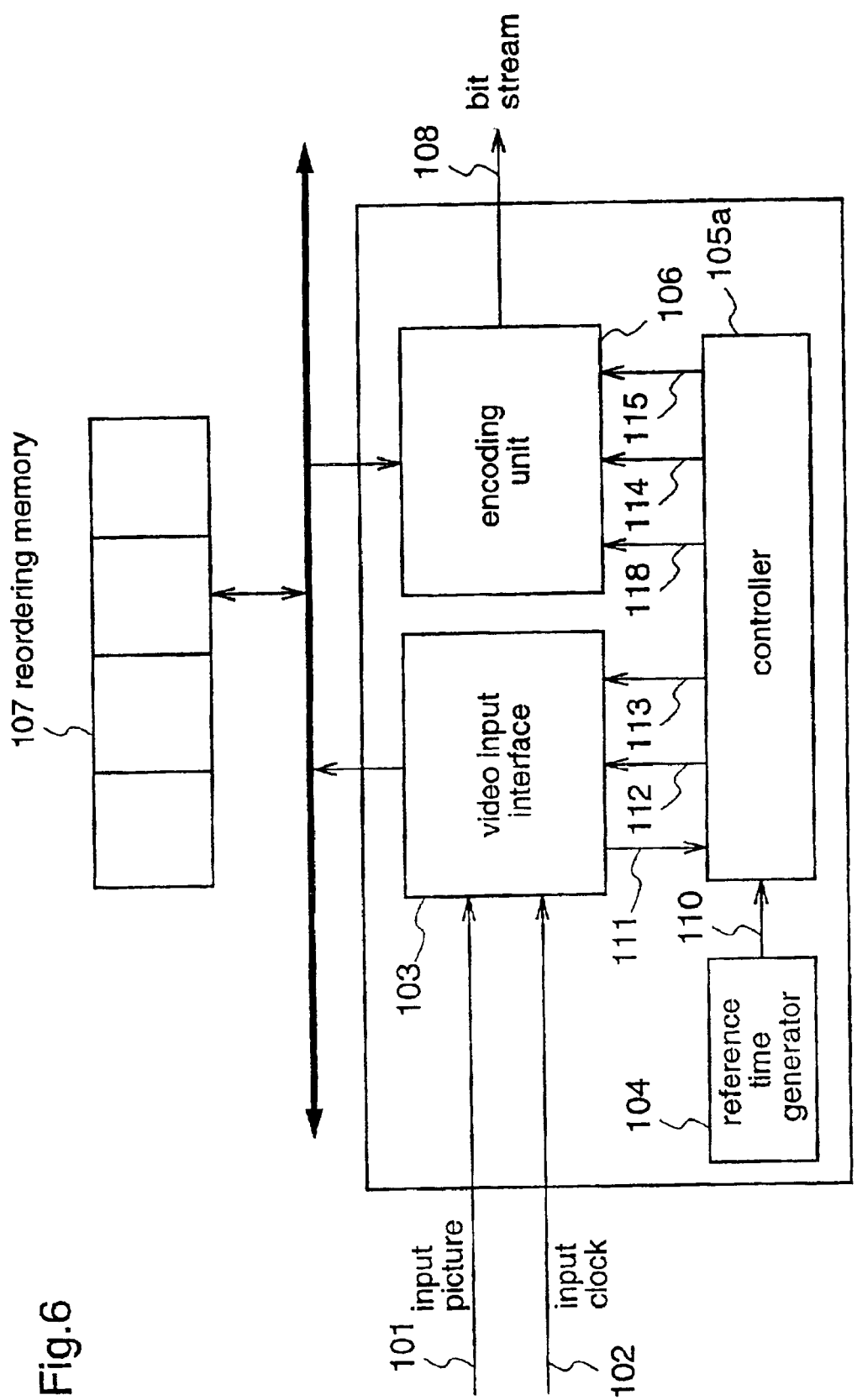
FIG. 6 is a block diagram illustrating the construction of a video encoding apparatus according to a second embodiment of the present invention.

Hereinafter, a video encoding apparatus according to a second embodiment of the present invention will be described. The video encoding apparatus according to this second embodiment performs control for discarding the latest picture when picture input intervals are short, and the fundamental structure of the video encoding apparatus of this second embodiment is identical to that of the first embodiment except a part of the control flow shown in FIG. 3. FIG. 6 is a block diagram illustrating the structure of the video encoding apparatus according to the second embodiment. In FIG. 6, reference numeral 105a denotes a controller. When no writable memory is found in the reordering memory 107, the controller 105a ends the processing without searching the data stored in the frame for one having the latest time and performing replacement of data. As a result, writing of new data into the reordering memory 107 is not carried out, and capture of data during this period of time is stopped.

Figure 7:
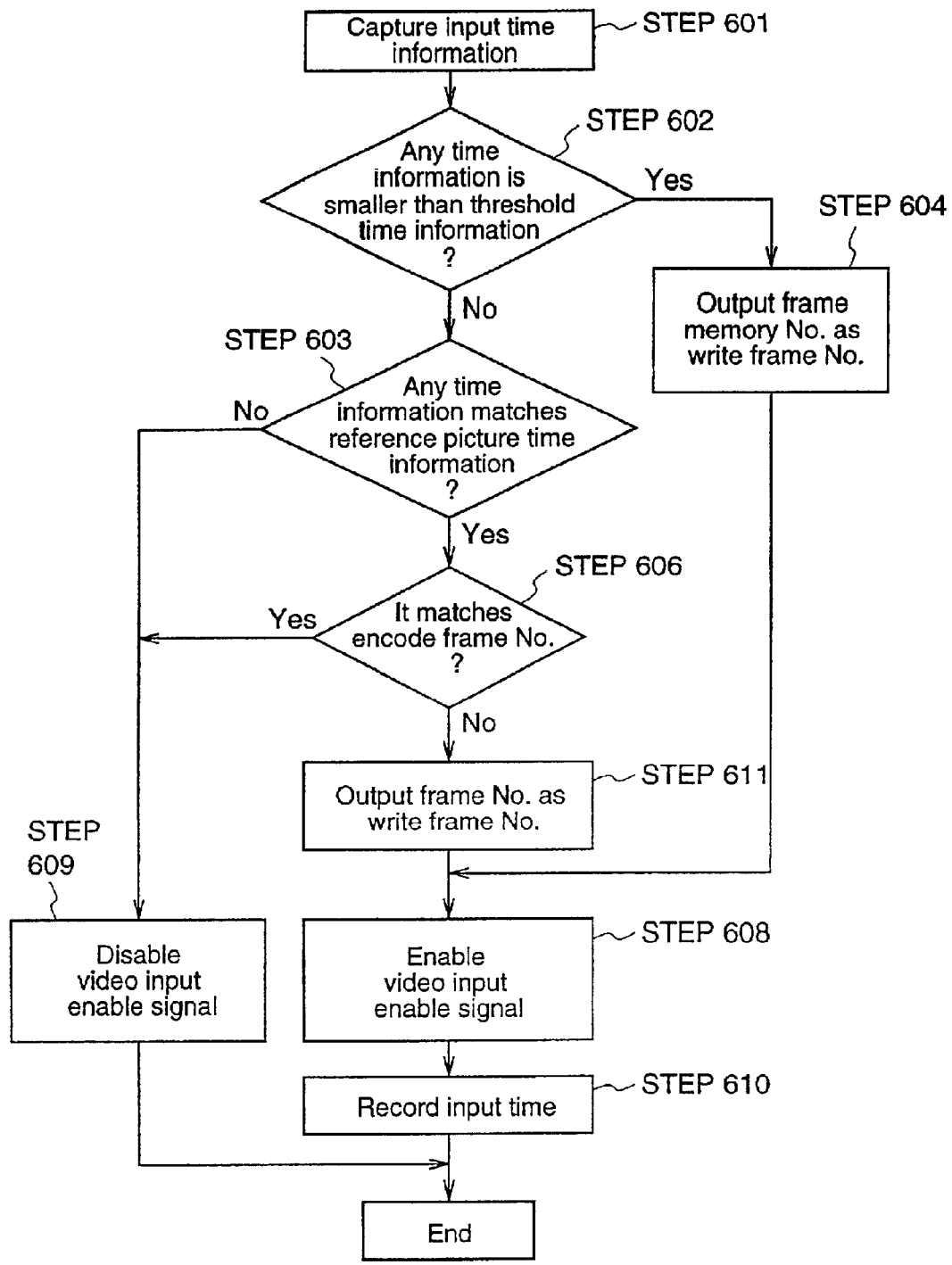
FIG. 7 is a flowchart illustrating the operation of a controller which is a component of the video encoding apparatus of the second embodiment, when a frame sync signal is inputted to the controller.

Hereinafter, a description will be given of the operation of the controller 105a in the case where the frame sync signal 111 is inputted, with reference to FIG. 7.

The controller 105a captures the time information 110 in STEP 601, and goes to STEP 602.

In STEP 602, it is judged whether any of the input time information 220~223 is smaller than the threshold time information 210 or not. When none of the input time information 220~223 is smaller than the threshold time information 210, the controller 105a goes to STEP 603. Otherwise, the controller 105a goes to STEP 604.

When the controller 105a goes to STEP 604, since a writable frame memory exists, the frame memory number corresponding to the input time information that is smaller than the threshold time information 210 is outputted as a write frame number 112, whereby the video input enable signal is set in the enable state in STEP 608, and recording of the input time is carried out in STEP 610 to complete the processing.

On the other hand, when the controller 105a goes to STEP 603, since data earlier than the threshold time information does not exist in the frame, it is judged whether any of the input time information 220~223 matches the reference picture time information 211 or not. When none of the input time information 220~223 matches the reference picture time information 211, it means that no writable area (frame memory) exists. So, the controller 105a goes to STEP 609, and disables the video input to complete the processing. On the other hand, when any of the input time information 220~223 matches the reference picture time information 211, the controller 105a goes to STEP 606. In STEP 606, it is judged whether the frame memory corresponding to the input time information that matches the reference picture time information 211 matches the encode frame number 114 or not. When the frame memory matches the encode frame number 114, it consequently means that no writable memory exists. So, the controller 105a goes to STEP 609, and disables the video input to complete the processing. On the other hand, when the frame memory does not match the encode frame number 114, since a writable memory exists, the controller 105a goes to STEP 611. In STEP 611, the controller 105a outputs the frame memory number corresponding to the input time information that matches the reference picture time information 211, as a write frame number 112, and then goes to STEP 608.

In STEP 608, the controller 105a sets the video input enable signal 113 in its enable state to enable writing, and goes to STEP 610. In STEP 610, the controller 105a writes the time information captured in STEP 601, into the area corresponding to the write frame number 112 among the input time information 220~223, thereby completing the processing.

As described above, the operation flow according to the second embodiment is almost identical to the flow which is described for the first embodiment with reference to FIG. 1, but a remarkable difference exists in that the second embodiment does not perform the process of searching for data having the maximum time, which process corresponds to STEP 305 in FIG. 3.

The use condition of the frame memory for the input frame according to the second embodiment will be described with reference to an operation timing chart shown in FIG. 8.

Figure 8:
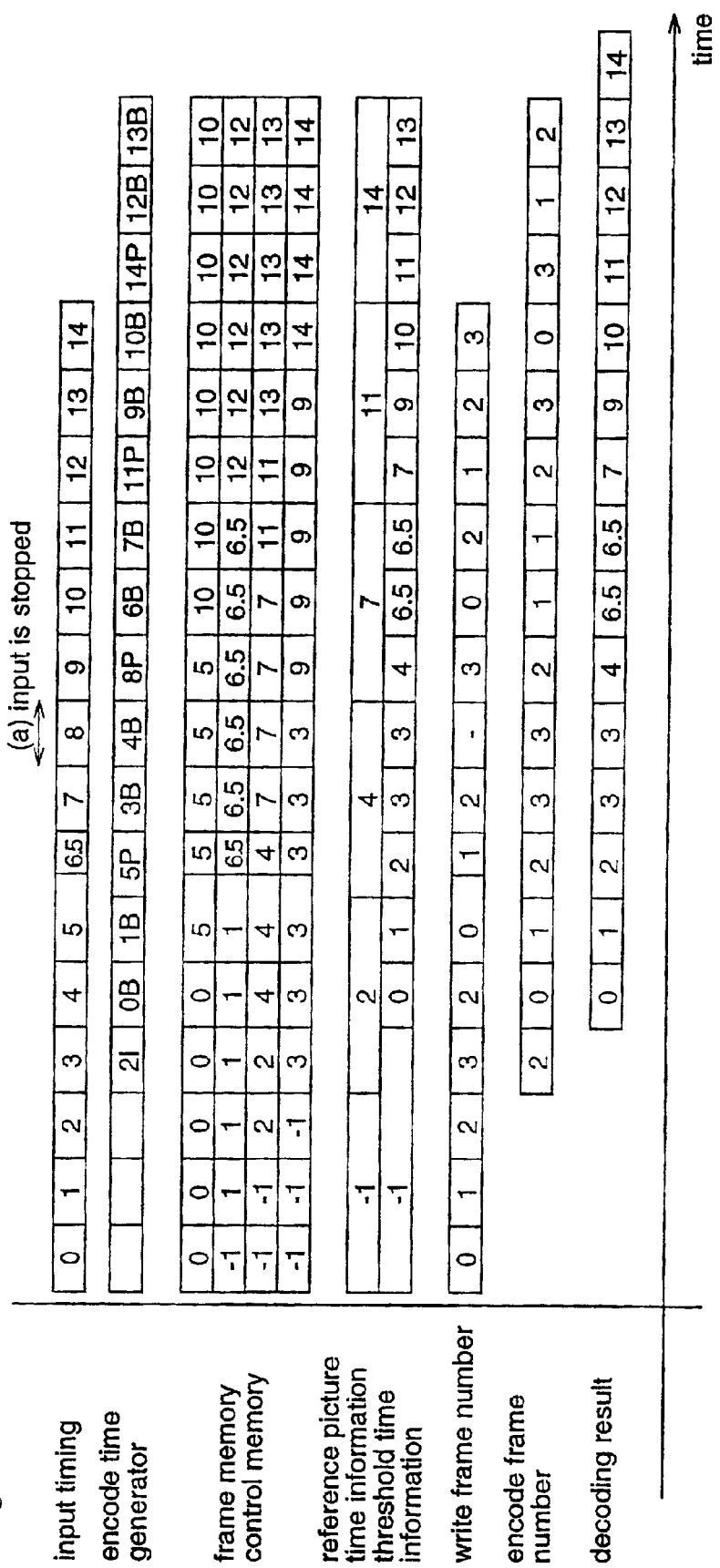
FIG. 8 is a timing chart illustrating the condition of use of a frame memory for input frames, in the video encoding apparatus according to the second embodiment.

As shown in FIG. 8, picture input is stopped during a period (a), and input of a picture "8" is not carried out. Other input operations are identical to those described with respect to FIG. 5.

The eventual decoding result is shown in the final stage of FIG. 8. As compared with FIG. 5, a portion where a picture of time "8" is outputted in FIG. 5 is replaced with a picture of time "7" in FIG. 8. Also in this second embodiment, the decoding result is normally outputted.

As described above, the video encoding apparatus according to the second embodiment is provided with the reference time generator 104 for generating a reference time, and the input picture data before being encoded and the time information generated by the reference time generator 104 are temporarily stored in the frame memories 107 for reordering, and the picture data stored in each frame memory is encoded according to the time information that is recorded simultaneously with the picture data. Therefore, even when vertical synchronization deviates, the data can be successively encoded according to the time information, whereby the disordered input pictures can be encoded with less sense of abnormality. Further, when there is no area in the frame memory where new data can be written, data input is stopped for one frame. Therefore, as compared with the first embodiment which performs the process of searching the data stored in the frame memory for one having the latest time and performing replacement of data, the judgement flow is reduced by an amount of this process, whereby the processing is simplified, leading to an increase in the processing speed.

Although the operation of the video encoding apparatus according to the first embodiment when the sync intervals of input data are short is different from that of the second embodiment, since these operations are almost identical from the viewpoint of control flow, a process of adaptively switching the above-described processes can be easily carried out.

Hereinafter, a case where such switching is positively carried out will be described as a third embodiment of the present invention.

[Embodiment 3]

Figure 9:
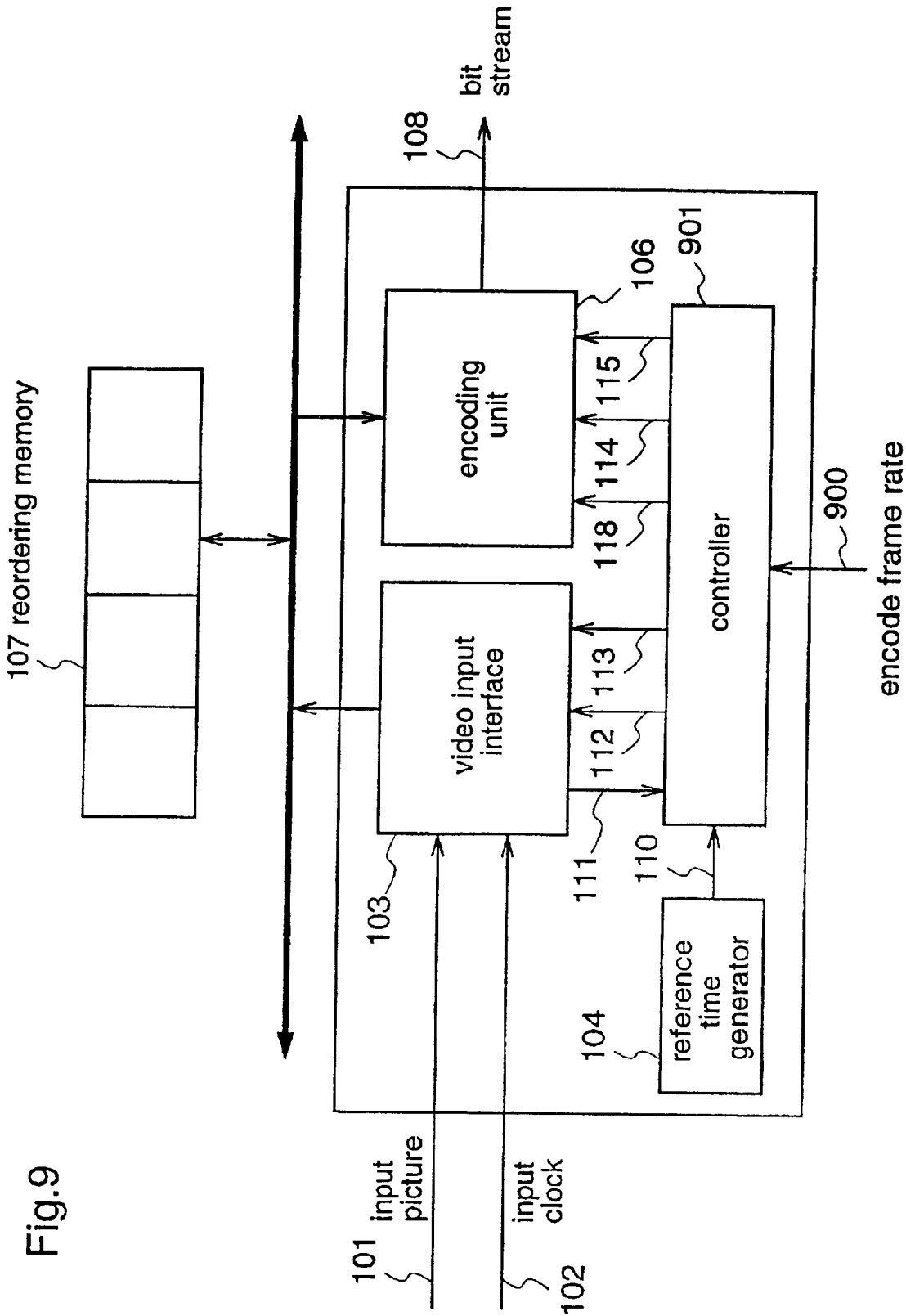
FIG. 9 is a block diagram illustrating the construction of a frame rate conversion apparatus according to a third embodiment of the present invention.
Figure 10:
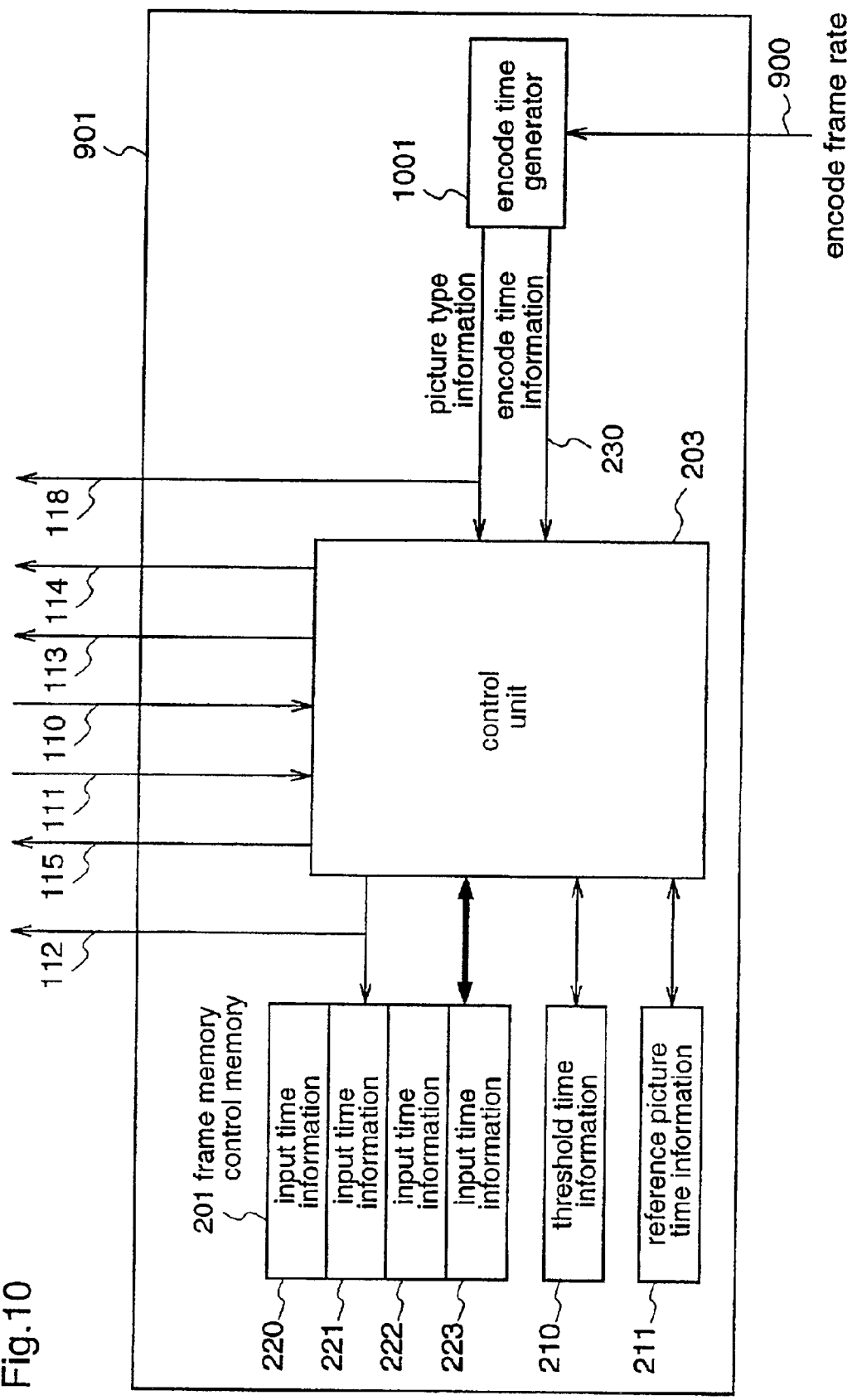
FIG. 10 is a block diagram illustrating the construction of a controller which is a component of the frame rate conversion apparatus.

FIG. 9 is a block diagram illustrating the structure of a frame rate conversion apparatus according to a third embodiment of the present invention. In FIG. 9, reference numeral 900 denotes an encode frame rate which is supplied from the outside, and this encode frame rate 900 realizes an encoding cycle setting means. Reference numeral 901 denotes a controller which receives the encode frame rate 900, and FIG. 10 is a block diagram illustrating the controller 901 in detail. In FIG. 10, reference numeral 1001 denotes an encode time generator (encode time generation means) for obtaining an ideal input time when an encoding target frame is to be encoded. Other constituents are identical to those described for the first embodiment.

Hereinafter, the operation of the frame rate conversion apparatus will be described. Since writing and reading of data in/from the reordering memory 107 are identical to those already described for the first and second embodiments, the frame rate conversion process will be mainly described in this third embodiment.

When a cycle T of an encode frame is decided by the encode frame rate 900, the encode time generator 1001 included in the controller 901 operates as follows. In the case where a reference picture is to be encoded, since an interval M of reference pictures is given, the encode time generator 1001 generates a time which is obtained by adding a product of M and T to the time of the previous reference picture.

Further, in the case where a "B" picture is to be encoded, when a picture which has been encoded one frame ahead is a reference picture, since a picture immediately after a forward reference picture is expected to be encoded, T is added to the encode time of the forward reference picture. Further, when a picture which has been encoded one frame ahead is a "B" picture, since a picture at a time next to the "B" picture may be encoded, T is added to the time which has occurred one frame ahead.

By performing the above-mentioned processing, encoding is carried out at a timing synchronized with the encode frame rate supplied from the outside, whereby a bit stream having a frame cycle which is completely different from the input frame cycle can be encoded.

FIG. 11 illustrates a timing chart in the case where encoding is carried out at a frame rate that is half the input frame rate.

As can be seen from FIG. 11, a picture having a double frame rate can be generated by twice encoding the same frame.

As described above, according to the third embodiment of the invention, the encode frame rate 900 is supplied from the outside, and an ideal input time of a target frame to be encoded is generated by the encode time generator 1001 included in the controller 901, and encoding is carried out in synchronization with the ideal input time. Therefore, encoding with a frame cycle which is completely different from the input frame cycle can be carried out, thereby controlling the frame rate at encoding.

What is claimed is:

1. A video encoding apparatus comprising:

a picture memory for holding inputted pictures;

a reference time generation means for generating time information to be a reference;

a picture input means for writing an inputted picture into a designated address in the picture memory;

an input time recording means for recording (a) a time that is outputted from the reference time generation means when a picture is inputted to the picture input means, and (b) an address in the picture memory where the inputted picture is written, such that the time is associated with the address;

an encoding means for encoding data in a designated address in the picture memory;

a picture memory designation means for designating addresses in the picture memory which are targeted for processing, and for indicating the addresses to the picture input means and the encoding means, respectively, on the basis of the information recorded by the input time recording means, and for stopping data input until a writable memory area is secured, if data in the picture memory has not yet been encoded when designating addresses for the picture input means.

2. A video encoding apparatus of comprising:

a picture memory for holding inputted pictures;

a reference time generation means for generating time information to be a reference;

a picture input means for writing an inputted picture into a designated address in the picture memory;

an input time recording means for recording (a) a time that is outputted from the reference time generation means when a picture is inputted to the picture input means, and (b) an address in the picture memory where the inputted picture is written, such that the time is associated with the address;

an encoding means for encoding data in a designated address in the picture memory;

a picture memory designation means for designating addresses in the picture memory which are targeted for processing, and indicating the addresses to the picture input means and the encoding means, respectively, on the basis of the information recorded by the input time recording means, and for designating a position corresponding to the latest time, if data in the picture memory has not yet been encoded when designating addresses for the picture input means.

3. A video encoding method of employing a picture memory for performing reordering of pictures for predictive coding, said method comprising:

writing an inputted picture into a designated address in a picture memory;

recording a time at which the picture is inputted, and the address in the picture memory where the inputted picture is written, such that the time is associated with the position;

designating addresses in the picture memory which are targeted for processing in said writing an inputted picture and an encoding step, respectively, on the basis of the information recorded in the input time recording step;

encoding data in a designated address in the picture memory; and stopping data input until a writable memory area is secured, if data in the picture memory has not yet been encoded when designating addresses for the picture inputting step.

4. A video encoding method employing a picture memory for performing reordering of pictures for predictive coding, said method comprising:

writing an inputted picture into a designated address in a picture memory;

recording a time at which the picture is inputted, and the address in the picture memory where the inputted picture is written, such that the time is associated with the position;

designating addresses in the picture memory which are targeted for processing in said writing an inputted picture and an encoding step, respectively, on the basis of the information recorded in the input time recording step;

encoding data in a designated address in the picture memory; and designating an address in the picture memory, which address corresponds to a latest time, if data in the picture memory has not yet been encoded when designating addresses in the picture inputting step.

5. A frame rate conversion apparatus comprising:

plural frame memories for holding inputted pictures;

a reference time generation means for generating a reference time;

a picture input means for writing an inputted picture into a designated address in a frame memory;

an input time recording means for recording (a) a time which is outputted from the reference time generation means when a picture is inputted to the picture input means, and (b) an address in the frame memory where the inputted picture is written;

an encoding cycle setting means for outputting an encoding cycle setting signal which designates an encoding cycle;

an encoding means for encoding data in a designated address in the frame memory; and a picture memory designation means for designating addresses in the frame memory which are targeted for processing, and indicating the addresses to the picture input means and the encoding means, respectively, on the basis of the information recorded by the input time recording means, and the encoding cycle setting signal outputted from the encoding cycle setting means.

* * * * *